United States Patent
Davydov et al.

(10) Patent No.: US 8,498,252 B2
(45) Date of Patent: Jul. 30, 2013

(54) MIDAMBLE FOR WIRELESS NETWORKS

(75) Inventors: Alexei Davydov, Nizhny Novgorod (RU); Huaning Niu, Milpitas, CA (US); Jiacheng Wang, Beijing (CN); Yuan Zhu, Beijing (CN); Gregory V. Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 762 days.

(21) Appl. No.: 12/646,226

(22) Filed: Dec. 23, 2009

(65) Prior Publication Data

US 2011/0002280 A1   Jan. 6, 2011

Related U.S. Application Data

(60) Provisional application No. 61/223,360, filed on Jul. 6, 2009.

(51) Int. Cl.
*H04W 4/00* (2009.01)
*H04W 74/00* (2009.01)
*H04K 1/10* (2006.01)

(52) U.S. Cl.
USPC ........... 370/329; 370/210; 370/348; 370/330; 370/352; 370/458; 455/446; 455/447; 455/455; 375/260; 375/295

(58) Field of Classification Search
USPC ........................ 370/328–473; 375/260–295
See application file for complete search history.

(56) References Cited

U.S. PATENT DOCUMENTS

| | | | |
|---|---|---|---|
| 7,002,900 | B2 | 2/2006 | Walton et al. |
| 7,336,599 | B2 * | 2/2008 | Hwang et al. ............... 370/208 |
| 7,339,979 | B1 * | 3/2008 | Kelkar ......................... 375/147 |
| 7,372,825 | B1 * | 5/2008 | Schmidl et al. ............. 370/328 |
| 8,204,510 | B2 * | 6/2012 | Mills .......................... 455/456.1 |
| 8,400,908 | B2 * | 3/2013 | Chun et al. .................. 370/210 |
| 2003/0130003 | A1 * | 7/2003 | Won ............................. 455/522 |
| 2006/0029017 | A1 * | 2/2006 | Mudulodu et al. .......... 370/328 |
| 2006/0262714 | A1 | 11/2006 | Tarokh et al. |
| 2007/0217539 | A1 * | 9/2007 | Ihm et al. .................... 375/267 |
| 2008/0043712 | A1 * | 2/2008 | Hart et al. .................... 370/348 |
| 2008/0298316 | A1 | 12/2008 | Bitran et al. |

(Continued)

FOREIGN PATENT DOCUMENTS

| | | |
|---|---|---|
| JP | 2006504366 A | 2/2006 |
| KR | 101205681 B1 | 11/2012 |
| WO | 2011/005726 A2 | 1/2011 |
| WO | 2011/005726 A3 | 4/2011 |

OTHER PUBLICATIONS

Office Action Received for Korean Patent Application No. 10-2012-7003144, Mailed on May 14, 2012, 3 pages of Office Action and 2 pages of English Translation.

(Continued)

*Primary Examiner* — Ayaz Sheikh
*Assistant Examiner* — Venkatesh Haliyur
(74) *Attorney, Agent, or Firm* — Cool Patent, P.C.

(57) ABSTRACT

Briefly, in accordance with one or more embodiments, a midamble for a downlink subframe is generated by rotating an order of midamble tones per antenna between two or more subbands. A Golay sequence may be utilized in the modulation of one or more subcarriers of the midamble via a reuse-3 arrangement. Alternatively, a reuse-1 arrangement may be applied to the midamble.

5 Claims, 6 Drawing Sheets

U.S. PATENT DOCUMENTS

| | | | | |
|---|---|---|---|---|
| 2009/0225720 | A1* | 9/2009 | Molisch et al. | 370/330 |
| 2010/0142436 | A1* | 6/2010 | Hart et al. | 370/315 |
| 2010/0322066 | A1* | 12/2010 | Chun et al. | 370/210 |
| 2011/0002280 | A1* | 1/2011 | Davydov et al. | 370/329 |
| 2011/0002430 | A1* | 1/2011 | Kim et al. | 375/362 |
| 2011/0286541 | A1* | 11/2011 | Chun et al. | 375/260 |

OTHER PUBLICATIONS

Office Action Received for Japanese Patent Application No. 2012-519655, Mailed on Jul. 17, 2012, 2 pages of Office Action and 2 pages of English Translation.

Kwon, et al., "Performance evaluation of MIMO Midamble", IEEE C802.16m-09/408, IEEE 802.16 Broadband Wireless Access Working Group, Feb. 25, 2009, pp. 1-5.

Davydov, et al., "MIMO midamble proposal", IEEE C802.16m-09/0770r4, IEEE 802.16 Broadband Wireless Access Working Group, Apr. 27, 2009, pp. 1-4.

Li, et al., "Enable closed-loop MIMO channel estimation using partially beamformed midamble", IEEE 802.16 Broadband Wireless Access Working Group, Nov. 4, 2004, 2 pages.

International Search Report and Written Opinion Received for PCT Patent Application No. PCT/US2010/041015, Mailed on Feb. 24, 2011, 8 pages.

International Preliminary Report and Patentability Received for PCT Patent Application No. PCT/US2010/041015, Mailed on Jan. 19, 2012, 5 pages.

Notice of Allowance for Japanese Application No. 2012-519655, Mailed on Nov. 7, 2012, 7 pages.

\* cited by examiner

MIDAMBLE FOR WIRELESS NETWORKS

CROSS-REFERENCE TO RELATED APPLICATIONS

The present application claims the benefit of U.S. Provisional Application No. 61/223,360 filed Jul. 6, 2009. Said Application No. 61/223,360 is hereby incorporated herein by reference in its entirety.

BACKGROUND

In wireless communication systems, to facilitate efficient closed loop downlink multiple-input and/or multiple-output (MIMO) operation, accurate pre-coding matrix index (PMI) and channel quality indicator (CQI) estimation is involved at the mobile station (MS) or subscriber station (SS). In order to facilitate MIMO operation, a midamble may be utilized in the downlink subframe. The MIMO midamble may be utilized for PMI selection and CQI calculation in a closed loop MIMO system, and to calculate CQI in an open loop MIMO system.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Figure 1:
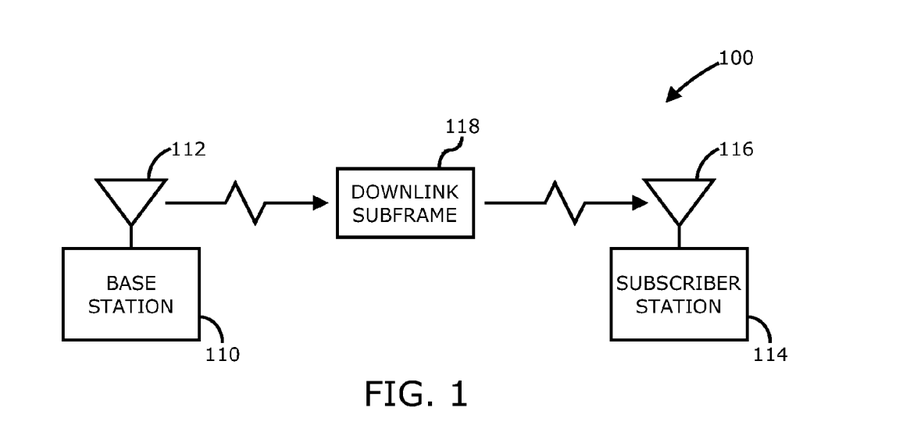
FIG. 1 is a block diagram of a communication system capable of transmitting a downlink subframe utilizing a midamble in accordance with one or more embodiments.

Referring now to FIG. 1, a block diagram of a communication system capable of transmitting a downlink subframe utilizing a midamble in accordance with one or more embodiments will be discussed. As shown in communication system 100 of FIG. 1, a transmitting device such as base station 110 transmits a downlink subframe 118 to a receiving device such as subscriber station 114. In one or more embodiments, base station 110 may have one or more antennas 112 and/or subscriber station 116 may have one or more antennas 116 to implement multiple-input and multiple-output (MIMO) operation. For example, base station 110 may have four transmitters and four transmit antennas 112 to transmit signals to subscriber station 114 that likewise may have four receivers and four receiver antennas 116. In general, downlink subframe 118 may be transmitted via MIMO and orthogonal frequency division multiplexing (OFDM) technology, although the scope of the claimed subject matter is not limited in these respects. In one or more alternative embodiments, base station 110 may communicate with subscriber station 114 using single-input and single-output (SISO) operation, single-input and multiple-output (SIMO) operation, and/or multiple-input and single-output (MISO) operation, although the scope of the claimed subject matter is not limited in this respect. Base station 110 may be disposed in a sector of a cell to server one or more sectors of a given cell, for example in a Worldwide Interoperability for Microwave Access (WiMAX) network or cellular network as one of many example networks. An example wireless network using a downlink subframe having a midamble is shown in and described with respect to FIG. 7, below. For example, a cell may include three collocated base stations 110 in a 120 degree arrangement wherein each base station 110 serves a corresponding sector comprising one third of the cell. Other base station, sector, and/or cell arrangements may likewise be utilized, and the scope of the claimed subject matter is not limited in these respects. In one or more embodiments, downlink subframe 118 may utilize one or more midambles as shown in and described with respect to FIG. 2, below.

Figure 2:
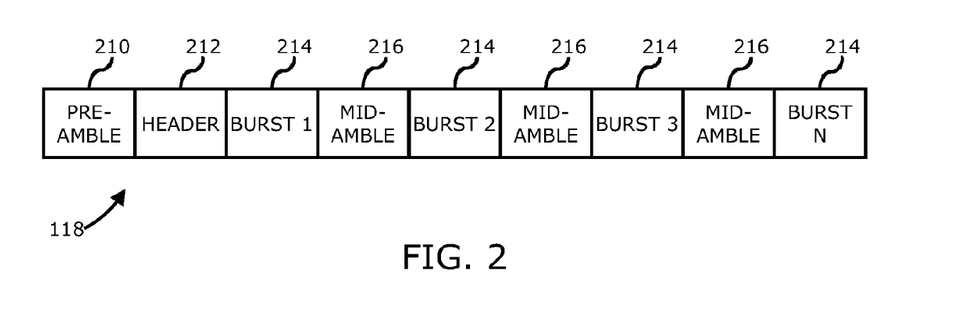
FIG. 2 is a diagram of a downlink subframe structure incorporating one or more midambles in accordance with one or more embodiments.

Referring now to FIG. 2, a diagram of a downlink subframe structure incorporating one or more midambles in accordance with one or more embodiments will be discussed. In one or more embodiments, downlink subframe 118 includes a preamble 210, header 212 and one or more bursts of data 214, up to N data bursts 214 per downlink subframe 118. The data bursts 214 may comprise one or more symbols of data to be transmitted in downlink subframe 118. The modulation rate may vary from data burst 214 to data burst 214 depending on several factors such as amount of data to be transmitted and/or channel quality. If the data bursts 214 are relatively long, one or more midambles 216 may proceed a respective data burst 214 in order to facilitate synchronization between base station 110 and subscriber station 114, and/or to facilitate precoding matrix (PMI) and/or channel quality indicator (CQI) estimation, for example for MIMO operation. In one or more embodiments, a frame comprises a number of subframes comprising one or more downlink (DL) subframes and/or one or more uplink (UL) subframes wherein each subframe comprises one or more orthogonal frequency-division multiple access (OFDMA) symbols. In accordance with one or more embodiments, one midamble may be transmitted in one of the downlink subframes of a frame, or alternatively one or more midambles may be transmitted in one or more of the downlink subframes of a frame, and the scope of the claimed subject matter is not limited in this respect.

Figure 3:
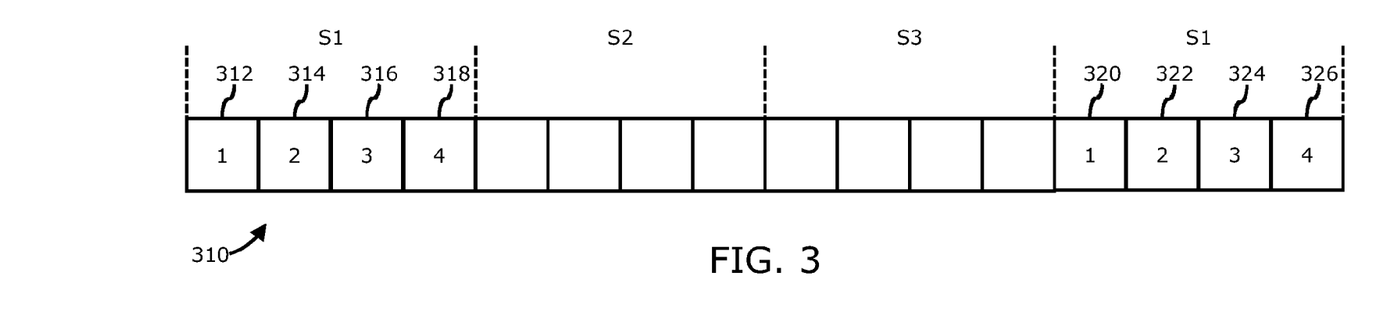
FIG. 3 is a diagram of subcarrier tone allocation illustrating a reuse-3 arrangement in accordance with one or more embodiments.

Referring now FIG. 3, a diagram of subcarrier tone allocation illustrating a reuse-3 arrangement in accordance with one or more embodiments will be discussed. As shown in FIG. 3, reuse-3 arrangement 310 shares the midamble tones within three sectors, sector S1, sector S2, and sector S3, in a frequency orthogonal manner. In reuse-3 arrangement 310, a four transmit antennas are used for purposes of example, however any number of antennas may be utilized, and the scope of the claimed subject matter is not limited in this respect. Since four tones are utilized per sector, for example tones 312, 314, 316, and 316 sector S1, for three sectors per cell, the effective decimation factor is 12 in the example shown in FIG. 3. However, other numbers of sectors and/or tones per sectors may be utilized, and the scope of the claimed subject matter is not limited in these respects. As shown in sector S1, the numbers 1, 2, 3, and 4 in respective tones 312, 314, 316, and 318 mean the tone is occupied by midamble tones for antenna 1, antenna 2, antenna 3, and antenna 4 of the four transmit antennas of the base station BS1 serving sector S1. Tones that do not include a respective antenna number as shown in sector S2 and sector S3 represent null tones where the other base stations BS2 and BS3 serving the other sectors may transmit their respective midambles. In a reuse-3 arrangement 310, the midamble tones for the base station BS1 are again transmitted at tones 320, 322, 324, and 326.

Figure 4:
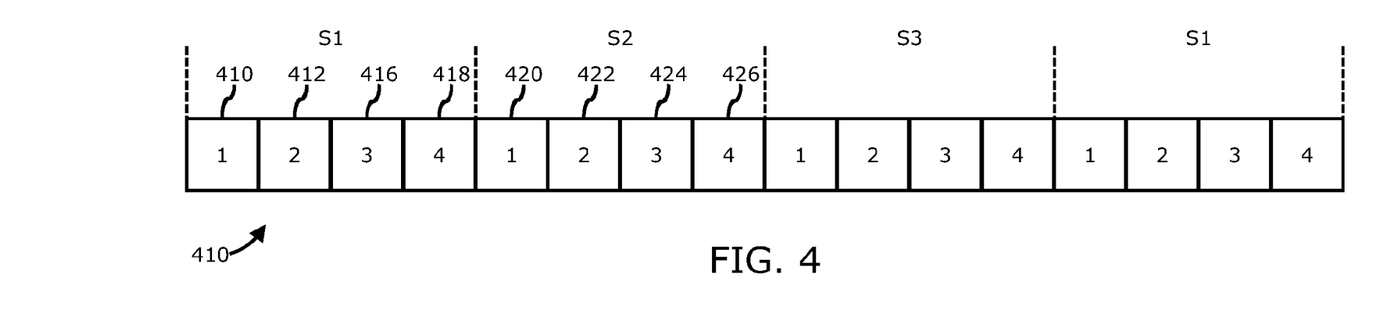
FIG. 4 is a diagram of subcarrier tone allocation illustrating a reuse-1 arrangement in accordance with one or more embodiments.

Referring now to FIG. 4, a diagram of subcarrier tone allocation illustrating a reuse-1 arrangement in accordance with one or more embodiments will be discussed. As shown in FIG. 4, reuse-1 arrangement 410 is similar to reuse-3 arrangement 310 of FIG. 3 with the following differences. In reuse-1 arrangement 410, all or nearly all midamble tones are assigned to one particular sector for respective antennas wherein midambles for antennas 1, 2, 3, and 4 are transmitted in tones 410, 412, 416, and 418, and are again transmitted at tones 420, 422, 424, and 426 for the next subsequent sector S2 and so on. As a result, it is possible that midamble tones from one base station may collide with midamble tones from one or more nearby base stations, although orthogonality may mitigate such interference, and the scope of the claimed subject matter is not limited in this respect.

Figure 5:
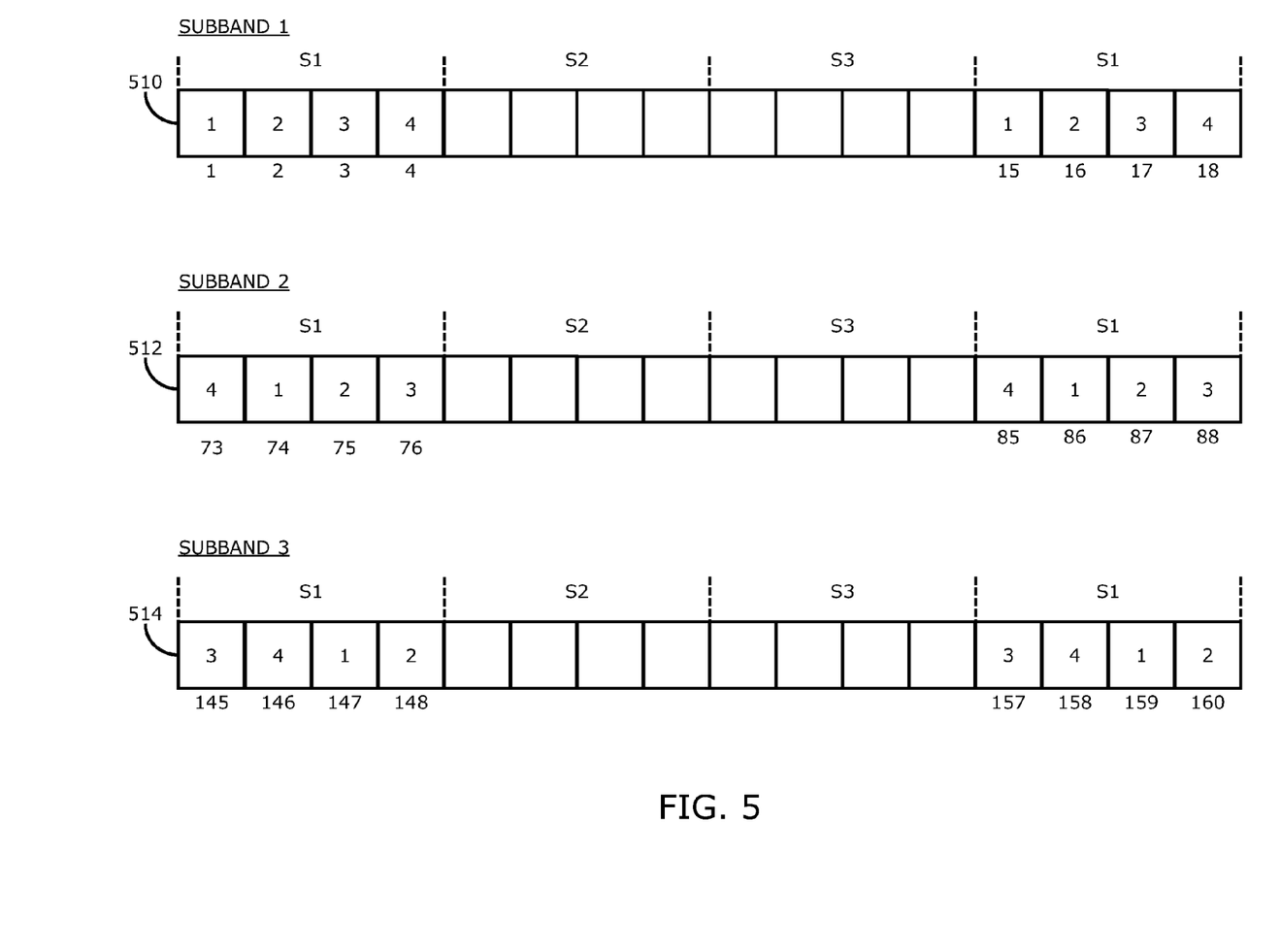
FIG. 5 is a diagram of subcarrier tone allocation illustrating subband based tone rotating in accordance with one or more embodiments.

Referring now FIG. 5, a diagram of subcarrier tone allocation illustrating subband based tone rotation in accordance with one or more embodiments will be discussed. As shown in FIG. 5, midamble tones for the different antennas are rotated from subband to subband, wherein there are four antennas in the present example. In one example embodiment, each subband may comprise 72 contiguous subcarriers. For example, for subband 1 as shown at arrangement 510, midambles for antennas 1, 2, 3, and 4 may occupy subcarrier 1, 2, 3, and 4 respectively. Using a reuse-3 arrangement, midambles for antennas 1, 2, 3, and 4 may occupy subcarriers 15, 16, 17, and 18 respectively, and the pattern may repeat up to the $72^{nd}$ subcarrier. The $73^{rd}$ subcarrier may then start in subband 2 wherein in the arrangement 512 shown a first tone rotation may be implemented such that the midambles for antennas 1, 2, 3 and 4 may occupy subcarrier 74, 75, 76, and 73 respectively. Likewise, in subband 2, midambles for antennas 1, 2, 3, and 4 may occupy subcarriers 86, 87, 88, and 85, respectively, and the pattern may repeat up to the $144^{th}$ subcarrier. The subband rotation of midamble tones may likewise continue in subband 3 wherein in the arrangement 514 shown the midambles for antennas 1, 2, 3, and 4 may occupy subcarriers 147, 148, 145, and 146, respectively. Likewise, the midambles for antennas 1, 2, 3, and 4 may occupy subcarriers 159, 160, 157, and 158, respectively. Thus, the patterns of allocating midamble tones to respective subcarriers, and for rotating the midamble tones for successive subbands may continue until all of the subcarriers and/or subbands have been allocated midamble tones. Subsequently, the subcarriers may then be modulated for transmission as discussed with respect to FIG. 6, below.

Figure 6:
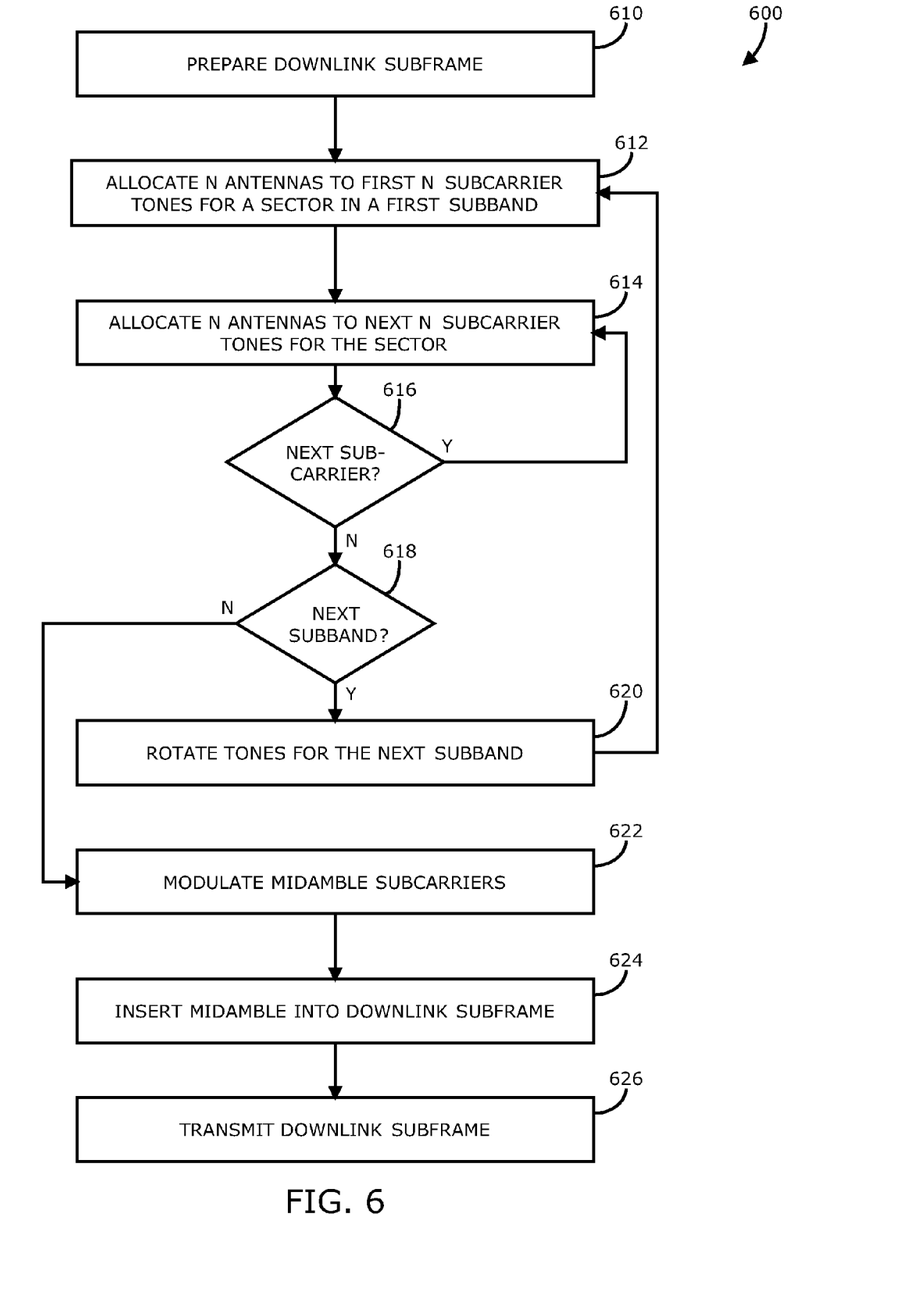
FIG. 6 is a flow diagram of a method for generating a midamble for a downlink subframe in accordance with one or more embodiments.

Referring now to FIG. 6, a flow diagram of a method for generating a midamble for a downlink subframe in accordance with one or more embodiments will be discussed. FIG. 6 shows one particular order of the blocks of method 600 for purposes of example, however the blocks of method 600 may be arranged in various other orders, and method 600 may include more or fewer blocks than shown, and the scope of the claimed subject matter is not limited in these respects. In one or more embodiments, a downlink subframe 118 may be prepared at block 610 for transmission by a transmitting device such as base station 110. At block 612, N transmit antennas may be allocated to the first N subcarrier tones for a sector in a first subband. At block 614, the N antennas are allocated to the next N subcarrier tones for the sector. For example, in the case of a reuse-3 arrangement 310 using four subcarriers, the next N antennas for the base station 110 may be the $13^{th}$, $14^{th}$, $15^{th}$, and $16^{th}$ subcarriers. If there are additional subcarriers as determined at block 616, the pattern may continue for next additional subcarriers by repeating block 614 until all of the midamble tones for the N antennas have been assigned to a respective subcarrier. Then, if there are additional subbands as determined at block 618, the midamble tones may be rotated at block 620 for the next subband when assigning midamble tones for the N antennas to respective subcarriers. The process may continue until all of the subcarriers of all the subbands have been assigned midamble tones for the respective N antennas, wherein the midamble subcarriers may be modulated at block 622. The midambles may be inserted into downlink subframe 118 at block 624, and the downlink subframe 118 including the midambles may be transmitted at block 626.

In one or more embodiments, the midamble sequence may be selected to have a lower peak-to-average power ratio (PAPR) property. In one or more embodiments where reuse-1 arrangement 410 is utilized, a lower partial cross-correlation sequence may be utilized. In one or more embodiments, modulation using a Golay sequence may be applied to the midambles 216, wherein a Golay sequence is capable of meeting both a lower PAPR property and a lower partial cross-correlation sequence. In one or more embodiments, the MIMO midamble is transmitted every frame on the second last downlink subframe. The midamble signal may occupy the first orthogonal frequency-division multiple access (OFDMA) symbol in a downlink (DL) type-1 or type-2 subframe. For a type-1 subframe, the remaining five consecutive symbols may form a type-3 subframe. For a type-2 subframe, the remaining six consecutive symbols form a type-1 subframe. The MIMO midamble signal transmitted by the base station (BS) antenna or antennas may be defined as:

fft is the Fast Fourier Transform (FFT) size used;

u is the IDcell/Segment ($0 \leq u \leq 255$);

$offset_D(fft)$ is an FFT size specific offset defined in Table 2, below;

$N_t$ is the number of transmit (Tx) antennas;

g is the antenna index ($0 \leq g \leq N_t-1$);

$N_1 * N_{sc} = 4*18$;

$N_1$ is the number of physical resource units (PRUs) per subband;

$N_{sc}$ is the number of subcarriers per PRU;

s=0, for $k \leq (N_{used}-1)/2$;

s=1, for $k > (N_{used}-1)/2$

TABLE 1

Golay sequence of length 2048 bits

| | | | | | | | | | | | |
|---|---|---|---|---|---|---|---|---|---|---|---|
| 0xEDE2 | 0xED1D | 0xEDE2 | 0x12E2 | 0xEDE2 | 0xED1D | 0x121D | 0xED1D | 0xEDE2 | 0xED1D | 0xEDE2 | 0x12E2 |
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | 0xEDE2 | 0xED1D | 0xEDE2 | 0x12E2 |
| 0xEDE2 | 0xED1D | 0x121D | 0xED1D | 0xEDE2 | 0xED1D | 0xEDE2 | 0x12E2 | 0x121D | 0x12E2 | 0xEDE2 | 0x12E2 |
| 0x121D | 0x12E2 | 0x121D | 0xED1D | 0x121D | 0x12E2 | 0xEDE2 | 0x12E2 | 0xEDE2 | 0xED1D | 0xEDE2 | 0x12E2 |
| 0x121D | 0x12E2 | 0xEDE2 | 0x12E2 | 0xEDE2 | 0xED1D | 0xEDE2 | 0x12E2 | 0xEDE2 | 0xED1D | 0x121D | 0xED1D |
| 0xEDE2 | 0xED1D | 0xEDE2 | 0x12E2 | 0x121D | 0x12E2 | 0xEDE2 | 0x12E2 | 0xEDE2 | 0xED1D | 0xEDE2 | 0x12E2 |
| 0xEDE2 | 0xED1D | 0x121D | 0xED1D | 0x121D | 0x12E2 | 0x121D | 0xED1D | 0xEDE2 | 0xED1D | 0x121D | 0xED1D |
| 0x121D | 0x12E2 | 0x121D | 0xED1D | 0x121D | 0x12E2 | 0xEDE2 | 0x12E2 | 0x121D | 0x12E2 | 0x121D | 0xED1D |
| 0xEDE2 | 0xED1D | 0x121D | 0xED1D | 0xEDE2 | 0xED1D | 0xEDE2 | 0x12E2 | 0xEDE2 | 0xED1D | 0x121D | 0xED1D |
| 0x121D | 0x12E2 | 0x121D | 0xED1D | 0xEDE2 | 0xED1D | 0x121D | 0xED1D | | | | |

$$s(t) = \text{Re}\left\{ e^{j2\pi f_c t} \sum_{k=0}^{k=N_{used}-1} b_k \cdot e^{j2\pi\left(k-\frac{N_{used}-1}{2}\right)\Delta f(t-T_g)} \right\}$$
$$k \neq \frac{N_{used}-1}{2}$$

where $b_k$ is a complex coefficient modulating the subcarriers in the midamble symbol. In one or more embodiments, $b_k$ for a reuse-3 arrangement 310 may comprise:

$$b_k = \begin{cases} 1 - 2 \cdot G([k + u + offset_D(fft)] \bmod fft), \\ 0, \text{ otherwise} \end{cases}$$

$$k \neq \frac{N_{used}-1}{2},$$

$$k\bmod(3*N_t) = \left(g + \left\lfloor \frac{k-s}{N_1*N_{sc}} \right\rfloor\right)\bmod N_t + N_t*(BSID \bmod 3)$$

For a reuse-1 arrangement 410, $b_k$ may comprise:

$$b_k = \begin{cases} 1 - 2 \cdot G([k + u + offset_D(fft)] \bmod fft), \\ 0, \text{ otherwise} \end{cases}$$

$$k \neq \frac{N_{used}-1}{2},$$

$$k \bmod N_t = \left(g + \left\lfloor \frac{k-s}{N_1*N_{sc}} \right\rfloor\right) \bmod N_t$$

where, k is the subcarrier index ($0 \leq k \leq N_{used}-1$);

$N_{used}$ is the number of usable subcarriers in the midamble symbol;

G(x) is the lower PAPR Golay sequence defined in Table 1, below ($0 \leq x \leq 2047$);

TABLE 2

Offsets in the Golay sequence

| FFT size | Offset |
|---|---|
| 2048 | 30 |
| 1024 | 60 |
| 512 | 40 |

In the above expressions for the coefficient $b_k$, if the requirement on the value, k, is satisfied as listed on the right hand side of the expression, then the midamble subcarrier is modulated according to the Golay sequence value for the $b_k$ coefficient, otherwise the midamble subcarrier is not modulated. The value u represents the identification (ID) number of the cell wherein in the example shown there are 128 cells wherein the modulation may be different for each cell. The offsets in Table 2 for a given FFT size correspond to the values for $offset_D(fft)$ in the above equations for the coefficient $b_k$ for reuse-3 arrangement 310 and a reuse-1 arrangement 410 as shown in FIG. 3 and FIG. 4, respectively. The offset values were selected via simulation to optimize, or nearly optimize, the time domain waveform to reduce or minimize peak-to-average power ratio of the time domain waveform. However it should be noted that other FFT sizes and/or other offset values may likewise be utilized, and the scope of the claimed subject matter is not limited in these respects. In one or more embodiments, the MIMO midamble 216 may be transmitted with a boosted level via additional amplification, for example by about +2 dB, although the scope of the claimed subject matter is not limited in this respect.

Figure 7:
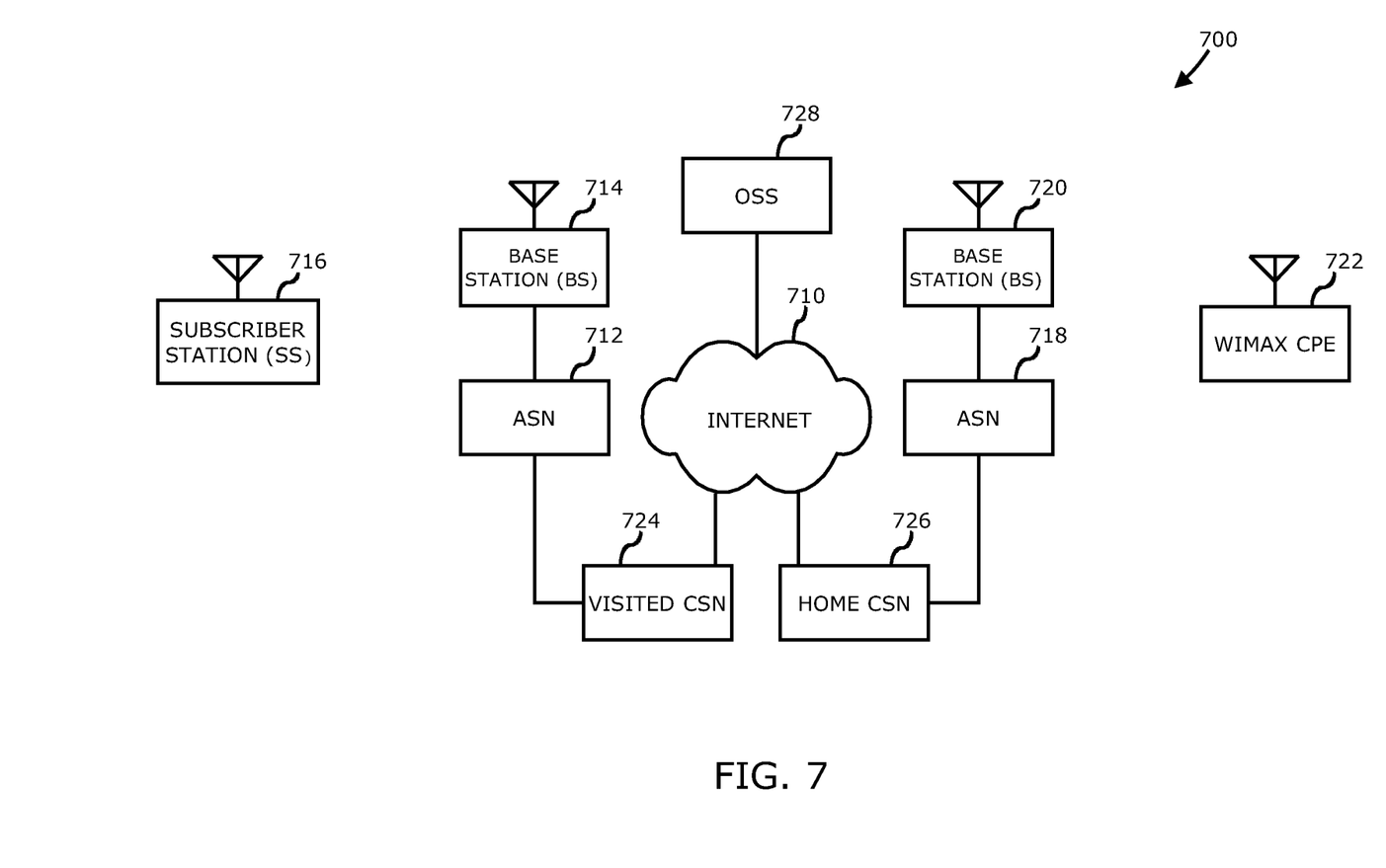
FIG. 7 is a block diagram of a wireless network utilizing a midamble in a downlink subframe in accordance with one or more embodiments.

Referring now to FIG. 7, a block diagram of a wireless network utilizing a midamble in a downlink subframe in accordance with one or more embodiments will be discussed. As shown in FIG. 7, network 700 may be an internet protocol (IP) type network comprising an Internet 710 type network or the like that is capable of supporting mobile wireless access and/or fixed wireless access to Internet 710. In one or more embodiments, network 700 may be in compliance with a Worldwide Interoperability for Microwave Access (WiMAX) standard or future generations of WiMAX, and in one particular embodiment may be in compliance with an Institute for Electrical and Electronics Engineers 802.16m standard (IEEE 802.16m). In one or more alternative embodiments network 700 may be in compliance with a Third Generation Partnership Project Long Term Evolution (3GPP LTE) or a 3GPP2 Air Interface Evolution (3GPP2 AIE) standard. In general, network 700 may comprise any type of orthogonal frequency division multiple access (OFDMA) based wireless network, and the scope of the claimed subject matter is not limited in these respects. As an example of mobile wireless access, access service network (ASN) gateway 712 or router is capable of coupling with base station (BS) 714 to provide wireless communication between subscriber station (SS) 716 and internet 710. Subscriber station 716 may comprise a mobile type device or information handling system capable of wirelessly communicating via network 700, for example a notebook type computer, a cellular telephone, a personal digital assistant, or the like. In one or more embodiments, base station 714 and subscriber station 716 may implement communication system 100 of FIG. 1 as base station 110 and subscriber station 114, respectively, by transmitting a downlink subframe 118 having one or more midambles 216. ASN gateway 712 may implement profiles that are capable of defining the mapping of network functions to one or more physical entities on network 700. Base station 714 may comprise radio equipment to provide radio-frequency (RF) communication with subscriber station 716, and may comprise, for example, the physical layer (PHY) and media access control (MAC) layer equipment in compliance with an IEEE 802.16m type standard. Base station 714 may further comprise an internet protocol (IP) backplane to couple to internet 710 via ASN gateway 712, although the scope of the claimed subject matter is not limited in these respects.

Network 700 may further comprise a visited connectivity service network (CSN) 724 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VOIP) gateways, and/or Internet protocol (IP) type server functions, or the like. However, these are merely example of the types of functions that are capable of being provided by visited CSN 724 or home CSN 726, and the scope of the claimed subject matter is not limited in these respects. Visited CSN 724 may be referred to as a visited CSN in the case for example where visited CSN 724 is not part of the regular service provider of subscriber station 716, for example where subscriber station 716 is roaming away from its home CSN such as home CSN 726, or for example where network 700 is part of the regular service provider of subscriber station but where network 700 may be in another location or state that is not the main or home location of subscriber station 716. In a fixed wireless arrangement, WiMAX type customer premises equipment (CPE) 722 may be located in a home or business to provide home or business customer broadband access to internet 710 via base station 720, ASN gateway 718, and home CSN 726 in a manner similar to access by subscriber station 716 via base station 714, ASN gateway 712, and visited CSN 724, a difference being that WiMAX CPE 722 is generally disposed in a stationary location, although it may be moved to different locations as needed, whereas subscriber station may be utilized at one or more locations if subscriber station 716 is within range of base station 714 for example. In one or more embodiments, base station 720 and customer premises equipment 722 may implement communication system 100 of FIG. 1 as base station 110 and subscriber station 114, respectively, by transmitting a downlink subframe 118 having one or more midambles 216. In accordance with one or more embodiments, operation support system (OSS) 728 may be part of network 700 to provide management functions for network 700 and to provide interfaces between functional entities of network 700. Network 700 of FIG. 7 is merely one type of wireless network showing a certain number of the components of network 700. However, the scope of the claimed subject matter is not limited in these respects.

Figure 8:
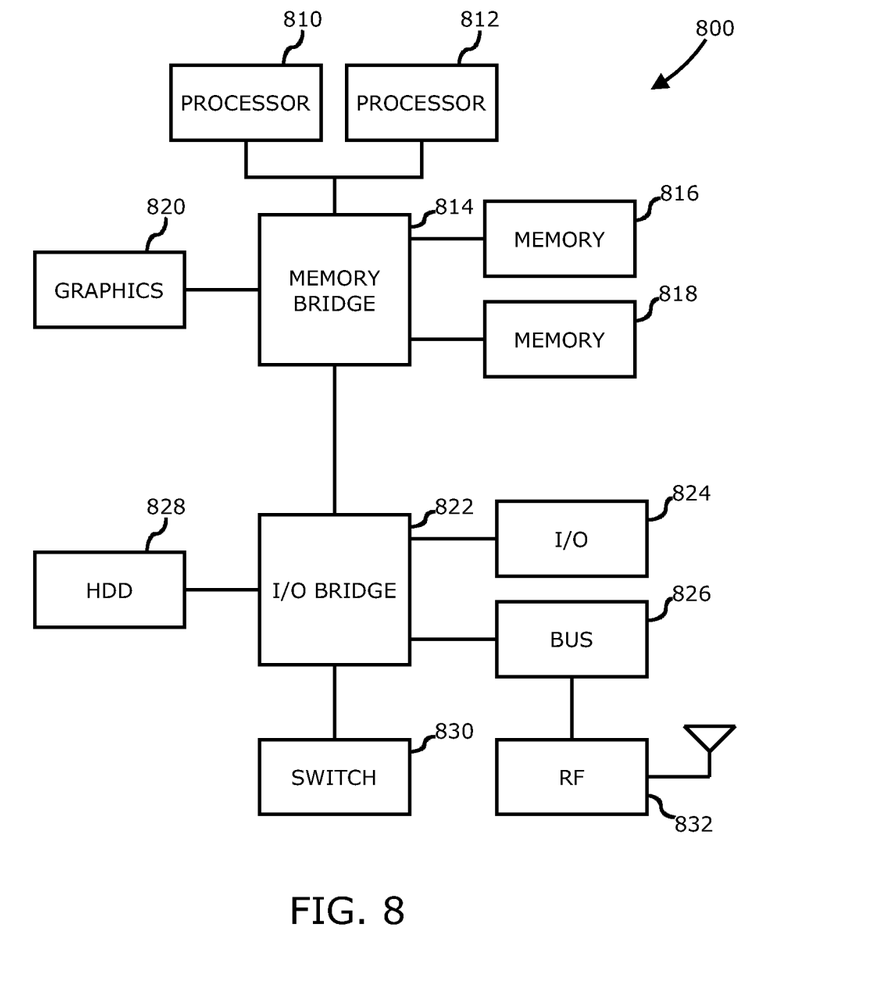
FIG. 8 is a block diagram of an information handling system capable of transmitting or receiving a downlink subframe having a midamble in accordance with one or more embodiments.

Referring now to FIG. 8, a block diagram of an information handling system capable of transmitting or receiving a downlink subframe having a midamble in accordance with one or more embodiments will be discussed. Information handling system 800 of FIG. 8 may tangibly embody one or more of any of the network elements of communication system 100 of FIG. 1 and/or network 700 as shown in and described with respect to FIG. 7. For example, information handling system 800 may represent at least some of the hardware of base station 110 and/or subscriber station 114 of FIG. 1, or base station 714 and/or subscriber station 716 of FIG. 7, with greater or fewer components depending on the hardware specifications of the particular device or network element. Although information handling system 800 represents one example of several types of computing platforms, information handling system 800 may include more or fewer elements and/or different arrangements of elements than shown in FIG. 8, and the scope of the claimed subject matter is not limited in these respects.

Information handling system 800 may comprise one or more processors such as processor 810 and/or processor 812, which may comprise one or more processing cores. One or more of processor 810 and/or processor 812 may couple to one or more memories 816 and/or 818 via memory bridge 814, which may be disposed external to processors 810 and/or 812, or alternatively at least partially disposed within one or more of processors 810 and/or 812. Memory 816 and/or memory 818 may comprise various types of semiconductor based memory, for example volatile type memory and/or non-volatile type memory. Memory bridge 814 may couple to a graphics system 820 to drive a display device (not shown) coupled to information handling system 800.

Information handling system 800 may further comprise input/output (I/O) bridge 822 to couple to various types of I/O systems. I/O system 824 may comprise, for example, a universal serial bus (USB) type system, an IEEE 1394 type system, or the like, to couple one or more peripheral devices to information handling system 800. Bus system 826 may comprise one or more bus systems such as a peripheral component interconnect (PCI) express type bus or the like, to connect one or more peripheral devices to information handling system 800. A hard disk drive (HDD) controller system 828 may couple one or more hard disk drives or the like to information handling system, for example Serial ATA type drives or the like, or alternatively a semiconductor based drive comprising flash memory, phase change, and/or chalcogenide type memory or the like. Switch 830 may be utilized to couple one or more switched devices to I/O bridge 822, for example Gigabit Ethernet type devices or the like. Furthermore, as shown in FIG. 8, information handling system 800 may include a radio-frequency (RF) block 832 comprising RF circuits and devices for wireless communication with other wireless communication devices and/or via wireless networks such as network 700 of FIG. 7, for example where information handling system 800 embodies base station 714 and/or subscriber station 716, although the scope of the claimed subject matter is not limited in this respect. In one or more embodiments, RF block 832 may comprise a radio-frequency transceiver, and processor 810 and/or processor 812 may implement the digital functions of the transceiver which may include processing of the baseband and/or quadrature signals, and so on, although the scope of the claimed subject matter is not limited in these respects.

Although the claimed subject matter has been described with a certain degree of particularity, it should be recognized that elements thereof may be altered by persons skilled in the art without departing from the spirit and/or scope of claimed subject matter. It is believed that the subject matter pertaining to midamble for wireless networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    for a first subband, allocating a number of antennas for transmitting midamble tones to a first group of subcarriers for a sector;
    repeatedly executing said allocating to a next group of subcarriers for the sector until an end of the subcarriers in a subband is reached;
    rotating an order of the antennas for transmitting the midamble tones to a different grouping arrangement, wherein the antennas are allocated to subcarriers according to a reuse-3 arrangement or a reuse-1 arrangement;
    repeating said allocating and said repeatedly executing for one or more additional subbands; and
    modulating one or more of the subcarriers with a Golay sequence that results in a relatively lower peak-to-average power ratio property and a relatively lower partial cross-correlation for the reuse-3 or reuse-1 arrangement.

2. A method, comprising:
    preparing a downlink subframe for transmission;
    generating one or more midambles for integration into the downlink subframe, wherein said generating comprises rotating an order of midamble tones per antenna between two or more subbands, wherein antennas are allocated to subcarriers according to a reuse-3 arrangement or a reuse-1 arrangement;
    modulating one or more of the subcarriers with a Golay sequence that results in a relatively lower peak-to-average power ratio property and a relatively lower partial cross-correlation for the reuse-3 or reuse-1 arrangement;
    integrating the one or more midambles into the downlink subframe; and
    transmitting the downlink subframe including the one or more midambles to a receiver.

3. An apparatus, comprising:
    a transceiver to transmit a downlink subframe; and
    a processor to generate one or more midambles for the downlink subframe, wherein the processor is capable of:
        rotating an order of midamble tones per antenna between two or more subbands, wherein antennas are allocated to subcarriers according to a reuse-3 arrangement or a reuse-1 arrangement;
        modulating one or more of the subcarriers with a Golay sequence that results in a relatively lower peak-to-average power ratio property and a relatively lower partial cross-correlation for the reuse-3 or reuse-1 arrangement;
        integrating the one or more midambles into the downlink subframe.

4. An apparatus, comprising:
    a transceiver to transmit a downlink subframe; and
    a processor to generate one or more midambles for the downlink subframe, wherein the processor is capable of:
        for a first subband, allocating a number of antennas for transmitting midamble tones to a first group of subcarriers for a sector;
        repeatedly executing said allocating to a next group of subcarriers for the sector until an end of the subcarriers in a subband is reached;
        rotating an order of the antennas for transmitting the midamble tones to a different grouping arrangement, wherein the antennas are allocated to subcarriers according to a reuse-3 arrangement or a reuse-1 arrangement;
        repeating said allocating and said repeatedly executing for one or more additional subbands; and
    modulating one or more of the subcarriers with a Golay sequence that results in a relatively lower peak-to-average power ratio property and a relatively lower partial cross-correlation for the reuse-3 or reuse-1 arrangement.

5. A base station, comprising:
    a transceiver to transmit a downlink subframe; and
    a processor to generate one or more midambles for the downlink subframe, wherein the processor is capable of:
        for a first subband, allocating a number of antennas for transmitting midamble tones to a first group of subcarriers for a sector;
        repeatedly executing said allocating to a next group of subcarriers for the sector until an end of the subcarriers in a subband is reached;
        rotating an order of the antennas for transmitting the midamble tones to a different grouping arrangement, wherein the antennas are allocated to subcarriers according to a reuse-3 arrangement or a reuse-1 arrangement;
        repeating said allocating and said repeatedly executing for one or more additional subbands;
        modulating one or more of the subcarriers with a Golay sequence that results in a relatively lower peak-to-average power ratio property and a relatively lower partial cross-correlation for the reuse-3 or reuse-1 arrangement.

* * * * *